Feb. 13, 1940.  G. POTAPENKO  2,190,322
METHOD OF GEOPHYSICAL PROSPECTING
Filed Dec. 24, 1937  5 Sheets-Sheet 1
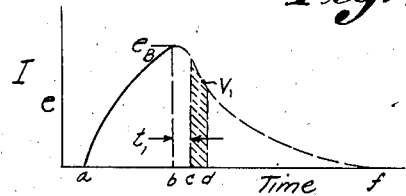
Fig. 4.
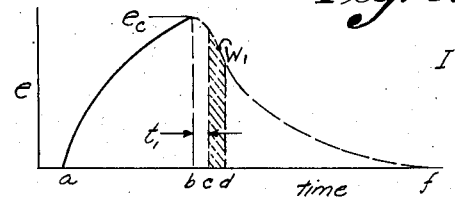
Fig. 5.
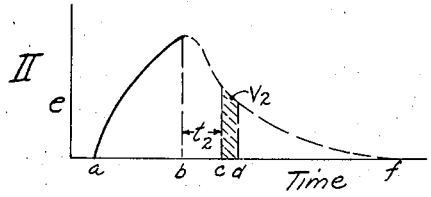
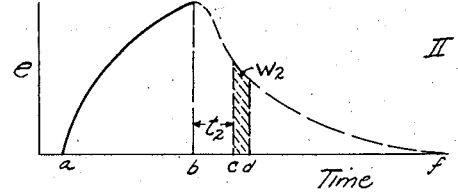
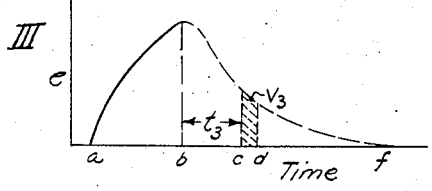
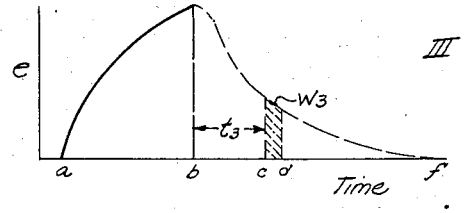
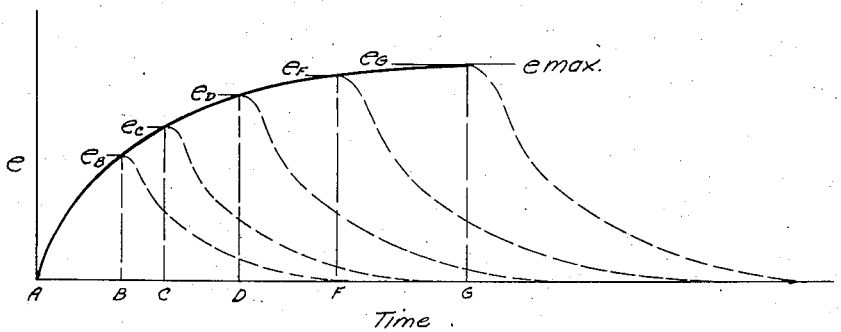
Fig. 7.
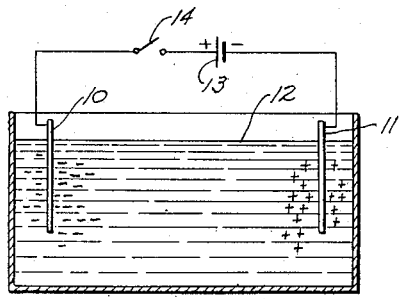
Fig. 1.
INVENTOR.
Gennady Potapenko,
BY Russell M. Otis
ATTORNEY.

Feb. 13, 1940.  G. POTAPENKO  2,190,322
METHOD OF GEOPHYSICAL PROSPECTING
Filed Dec. 24, 1937   5 Sheets-Sheet 2

INVENTOR.
Gennady Potapenko,
BY Russell M. Otis
ATTORNEY.

Feb. 13, 1940.     G. POTAPENKO     2,190,322
METHOD OF GEOPHYSICAL PROSPECTING
Filed Dec. 24, 1937     5 Sheets-Sheet 3
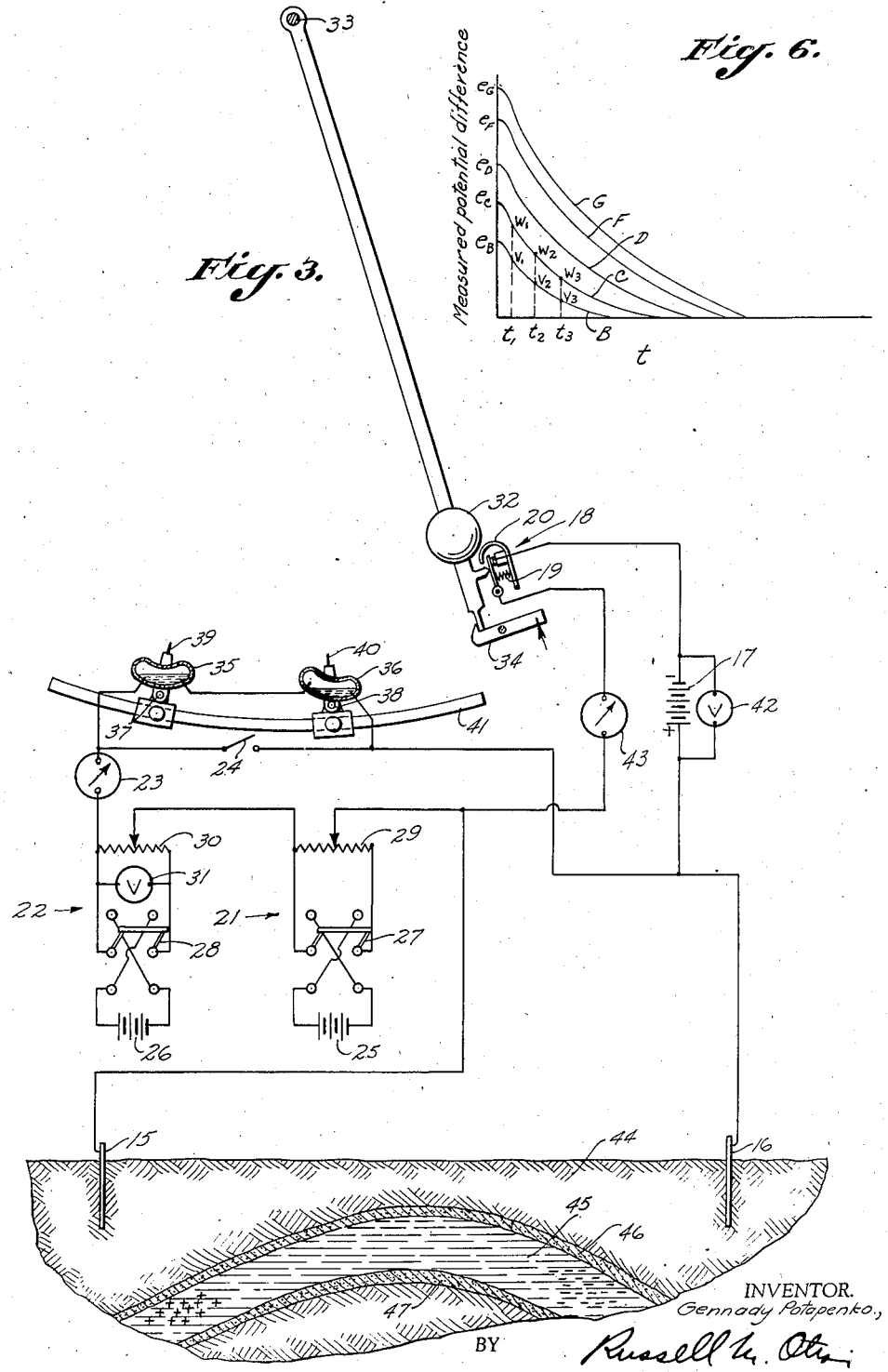

Feb. 13, 1940.  G. POTAPENKO  2,190,322
METHOD OF GEOPHYSICAL PROSPECTING
Filed Dec. 24, 1937    5 Sheets-Sheet 4

INVENTOR.
Gennady Potapenko,
BY Russell H. Otis
ATTORNEY.

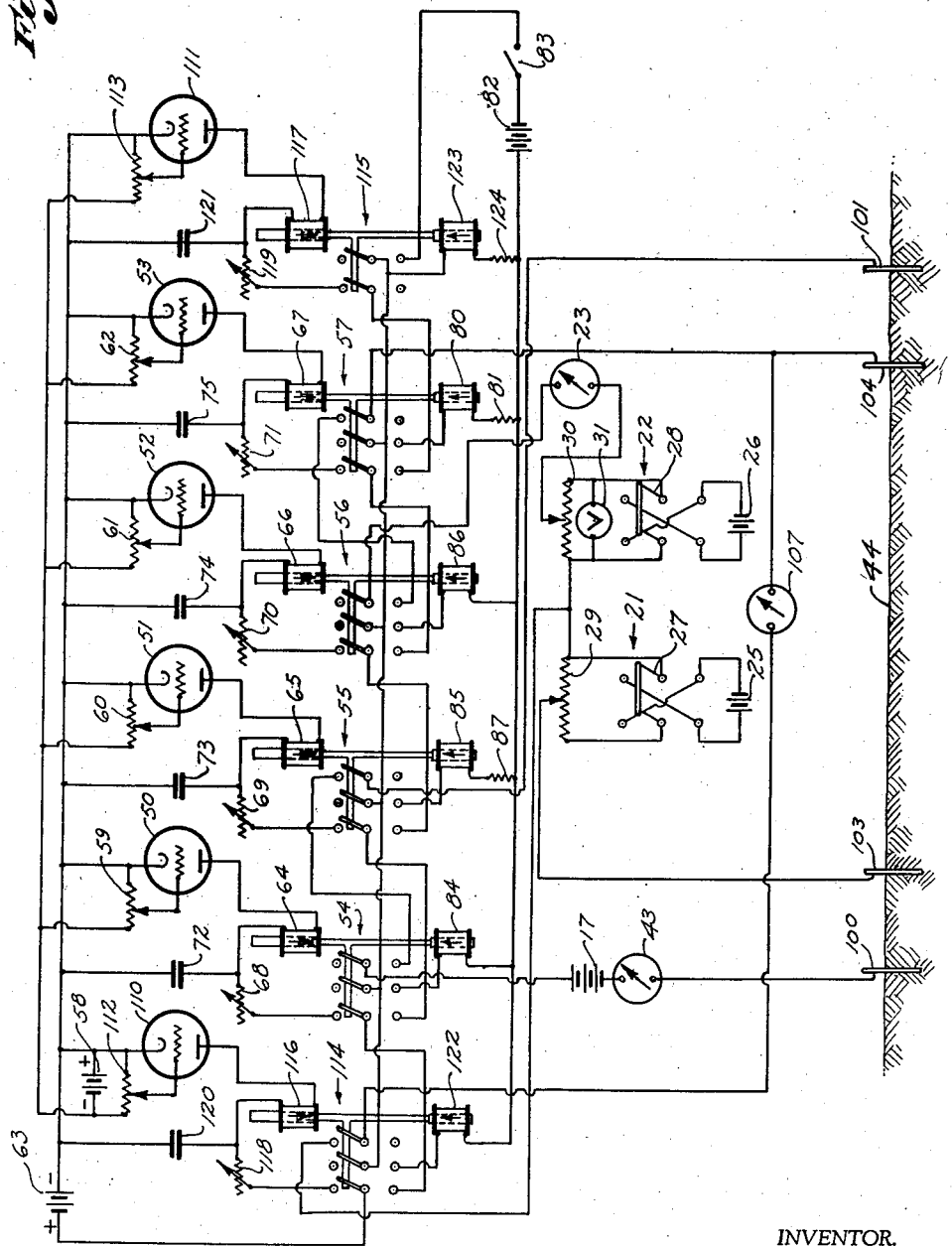

Patented Feb. 13, 1940

2,190,322

UNITED STATES PATENT OFFICE 2,190,322

METHOD OF GEOPHYSICAL PROSPECTING

Gennady Potapenko, Pasadena, Calif., assignor to Geo-Frequenta Corporation, a corporation of Delaware Application December 24, 1937, Serial No. 181,595

7 Claims. (Cl. 175—182)

This invention relates to geophysical prospecting and particularly to a method of determining the electrolytic polarization characteristics of underground formations and structures.

An object of my invention is to provide a method of geophysical prospecting by which one may determine the electromotive force of polarization of the earth and its manner of variation with time, both in building up and in discharging.

Another object of the invention is to provide a method of determining the electromotive force of polarization of the earth and the manner of its build up and discharge with time which avoids distortion of these functions.

Another object is to provide a method of determining the electromotive force of polarization of the earth without error due to normal earth currents which may exist, or due to variation of these currents.

Still another object of the invention is to provide apparatus for performing the afore-mentioned methods.

These and other apparent objects I attain in a manner which will be clear from a consideration of the following description taken in connection with the accompanying drawings, of which:

Fig. 1 illustrates apparatus used to demonstrate the principles of electrolytic polarization upon which the invention is based.

Fig. 2 illustrates the relationship between the E. M. F. of polarization and time.

Fig. 3 shows one form of apparatus that may be employed in practicing my invention.

Fig. 4 shows three different conditions under which measurements are made in the practice of my invention.

Fig. 5 shows three different conditions under which measurements are made, these conditions differing from those of Fig. 4 in including a longer period of polarization.

Fig. 6 shows the manner in which are plotted the data obtained from measurements under conditions as in Figs. 4 and 5.

Fig. 7 shows the manner in which are plotted data obtained from the plots of Fig. 6 to obtain a curve of the E. M. F. vs. time in the polarizing period.

Figures 8, 9:
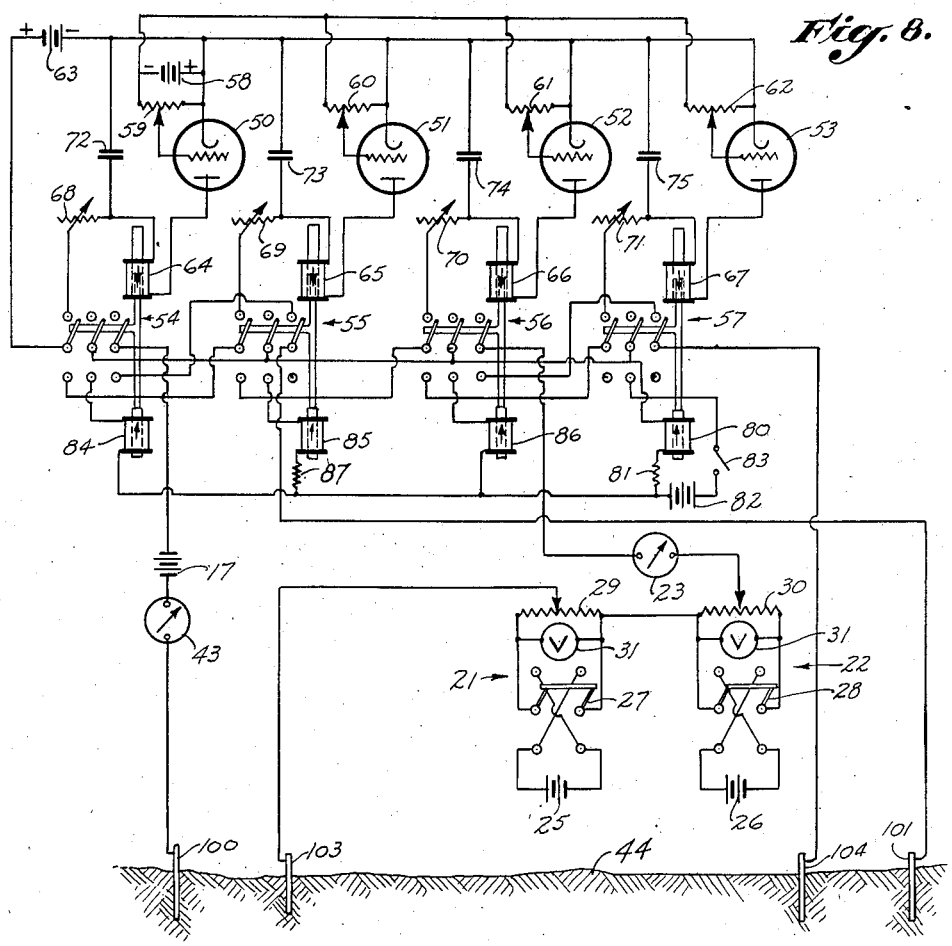

Fig. 8 is a diagram of apparatus employed in the practice of my invention.

Fig. 9 is a simplified diagram illustrating the functions of the apparatus of Fig. 8.

Figure 10:
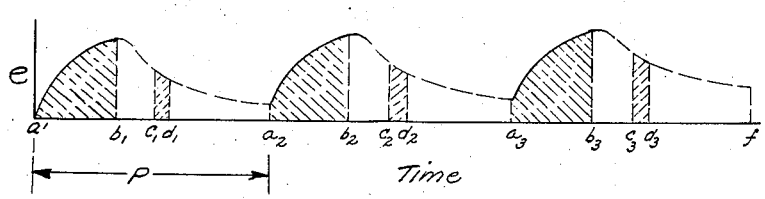

Fig. 10 illustrates the manner of variation of E. M. F. of polarization vs. time and the conditions of measurement when more than one cycle of events is employed.

Fig. 11 is a diagram of another apparatus that may be employed in the practice of my invention.

Figure 12:
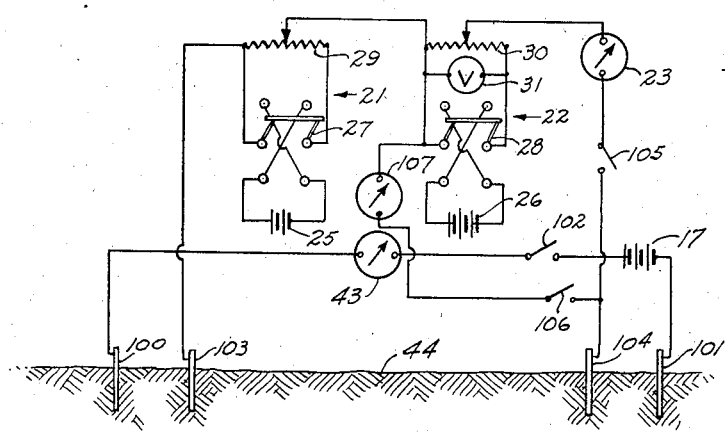

Fig. 12 is a simplified diagram illustrating the functions of the apparatus of Fig. 11.

Figure 13:
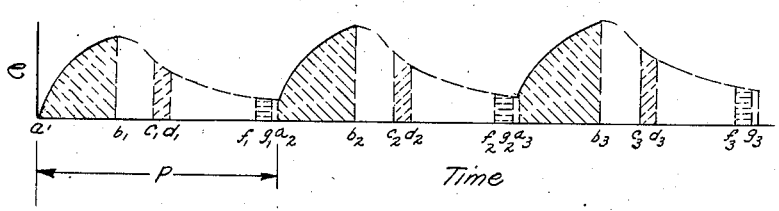

Fig. 13 illustrates the manner of variation of E. M. F. of polarization vs. time and the conditions of measurement employed in the use of the apparatus of Fig. 11 in the preferred manner.

Figure 2:
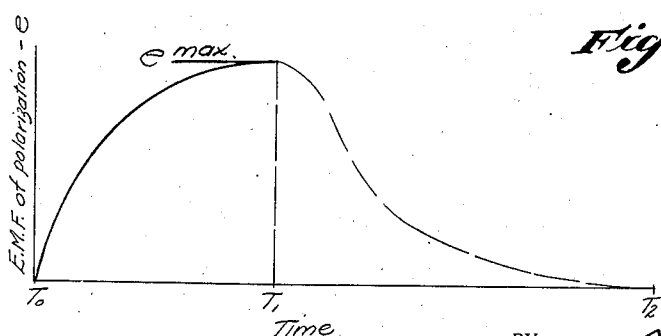

My invention is based upon the phenomenon of electrolytic polarization which can best be understood by reference to Figs. 1 and 2. Consider the simple circuit consisting of two spaced electrodes 10 and 11 in electric contact with an electrolyte 12, and in circuit with a source 13 of direct current, and a switch 14. When the switch 14 is closed, current starts to flow through the circuit with an initial value determined by Ohm's law, but gradually decreases to a minimum due to polarization which is built up in the electrolyte. This polarization which is responsible for the decrease of current in an electrolytic circuit may be considered as mainly due to the concentration of electrically-charged ions at inhomogeneities in the electrolyte, amounting in effect to an electromotive force in the electrolyte portion of the circuit in opposition to the applied E. M. F. In the apparatus of Fig. 1, the surfaces of electrodes 10 and 11 constitute inhomogeneities; hence negatively-charged ions are found in the neighborhood of positive electrode 10 and positively-charged ions are found in the neighborhood of negative electrode 11.

The earth conducts current chiefly as an electrolyte, and since it is composed of many substances which are largely distributed in the earth in strata, there are many inhomogeneities and many obstacles to the free passage of ions therethrough. The various boundaries between dissimilar formations existing in the earth therefore afford excellent opportunity for the accumulation of ions and the resultant production of polarization effects. Since the polarization effects are dependent upon the underground formations and structures in which they arise, they may be used for the determination of these formations and structures.

Assuming the switch 14 is closed at time $T_0$ in Fig. 2, the E. M. F. of polarization, corresponding to decrease of current in the circuit, will build up according to the curve of $e$ shown from time $T_0$ to $T_1$. It will be observed that the E. M. F. of polarization increases and asymptotically approaches the value $e_{max}$. At time $T_1$, if the switch 14 is opened, the E. M. F. of polarization $e$ will discharge itself through the electrolyte between the concentrations of oppositely-charged ions and will, in consequence, decrease rapidly and asymptotically approach zero, which is substantially reached at time $T_2$. When the switch 14 is open and polarization is decreasing, a potential difference, proportional to the E. M. F. of polarization exists between the electrodes 10 and 11, and the manner in which the E. M. F. of polarization $e$ decreases to zero is reflected by the manner in which the potential difference at the electrodes decreases, the one being proportional to the other.

According to my invention, I provide an efficient method for determining the shape of the curve of $e$ of Fig. 2, as will be hereinafter described in detail. It will be obvious from what follows that the information contained in this curve constitutes a very valuable tool in geophysical prospecting to aid in determining both the structure and composition of underground formations.

The degree of polarization for the same applied E. M. F. is different for different substances, and this effect alone may be employed to recognize underground formations. For example, oil-bearing sand polarizes to a different extent from other substances, and a different degree of polarization as indicated by a different value of $e_{max}$ may be indicative of the presence of oil.

The presence of oil in a formation also tends to delay polarization by a time interval which in pure oil is of the order of 1 second. The shape of the curve of E. M. F. of polarization vs. time for earth containing oil, therefore, should be different from that for ordinary electrolytes. Thus, as pointed out in a copending application of mine, this difference in the dependence upon time of the earth polarization becomes important in indicating the type of underground formations. Practically, the slopes of the $e$ curve similar to Fig. 2 may be found at various points along it and these slopes and the rate of change of slope calculated from them may be used for numerically describing the shape of the curve.

I may determine the shape of the curve of $e$ vs. time in the following manner by use of the apparatus illustrated in Fig. 3. Non-polarizing electrodes 15 and 16 are electrically connected to the earth 44 at locations spaced apart from one another. To these electrodes I connect a polarizing circuit comprising a source 17 of direct current having a voltmeter 42 across it, a direct current measuring instrument 43, and a switch 18. The switch 18 is equipped with a compression spring 19 tending to keep the switch in the open position and a stop 20 limiting the travel of the switch arm in the open position. I also connect to the electrodes 15 and 16 a measuring circuit comprising the balancing circuits 21 and 22, the direct current measuring instrument 23 and the switch 24. The balancing circuits 21 and 22 comprise sources 25 and 26, respectively, of direct current connected by reversing double-pole, double-throw switches 27 and 28, respectively, to potentiometers 29 and 30, respectively. The variable portions of the potentiometers are connected in series and in the measuring circuit. A voltmeter 31 is connected across the fixed part of the potentiometer 30 to measure the voltage of the source 26.

The switches 18 and 24 may be manually operated, but in the course of my measurements, it is desirable to maintain the switch 24 closed for a brief but accurately determined time which follows the opening of switch 18 by another brief but accurately determined time interval. I, therefore, prefer to employ a means for accurately adjusting these time intervals and automatically securing the sequence of operations desired. For this purpose, I provide a pendulum 32 of suitable period which is suspended from the pivot 33 and controls the polarizing and measuring circuits in its swing. In its uppermost position shown in Fig. 3, the pendulum engages the arm of switch 18 and holds it in closed position. The pendulum is held in its uppermost position by the latch 34, which may be operated to release the pendulum by pushing up on the handle of the latch in the direction of the arrow shown. Along the arc of travel of the end of the pendulum are located two movable switches 35 and 36 adapted to be operated by the passage thereover of the pendulum 32. These switches may be, as shown, of the mercury type and consist of glass bulbs containing mercury which shifts when the bulbs are tilted so as to complete or open the circuit between two contacts sealed in the bulbs. Here the mercury switches 35 and 36 are shown mounted on pivots 37 and 38, respectively, the switch 35 being normally in the closed position and switch 36 normally in the open position. The switches 35 and 36 are electrically connected in series and across the switch 24. The arms 39 and 40 are attached to switches 35 and 36, respectively, and project up into the path of the end of pendulum 32 so that as the pendulum passes switch 36 it tilts the switch into closed position, and as it passes switch 35 it tilts this switch into the open position. The time interval between start of the downward swing and operation of either switch is determined accurately by the position of the switch along the arc of travel of the pendulum, and for easy adjustment of this position, I mount the switches 35 and 36 on blocks that slide on the arcuate rod 41 and are held in position by thumb screws.

In the operation of the apparatus, I preferably first open switch 18 and close switch 24. Then, with switch 27 in position to connect battery 25 with proper polarity, and with the potentiometer 30 set to insert zero potential difference into the measuring circuit, I balance out earth currents by adjusting the potentiometer 29 until no current is indicated by the instrument 23. I then open switch 24, and close switch 18 by placing the pendulum in its uppermost position shown, and keep it there for a definite period of time, as $a\ b$ in Fig. 4. During this time the electromotive force of the source 17 is impressed across the electrodes 15 and 16 and the electromotive force of polarization of the earth is building up as shown in Fig. 4. This polarization may arise, for example, in the oil-bearing zone 45 which is isolated on both sides by shale layers 46 and 47. Assuming the positive terminal of source 17 to be connected to electrode 16 and the negative terminal of source 17 to the electrode 15, negatively-charged ions attempting to move toward electrode 16, and positively-charged ions attempting to move toward electrode 15, may accumulate at the inhomogeneity formed by the boundary between oil-bearing zone 45 and shale layer 46, as shown. The presence of these concentrations of electrically-charged ions then acts as a counter-electromotive force opposed to the applied electromotive force, creating the condition known as polarization. When electrodes which are not of the non-polarizing type are employed, polarization takes place at the electrode surfaces as well; and since the polarization which is of paramount importance from the geophysical standpoint is that which exists in deep underlying strata, it will be obvious that non-polarizing electrodes should be used in order that the polarization which is measured is only that which is geophysically significant.

After a chosen time interval $a\ b$, I trip the latch 34, allow the pendulum to start downward and open the switch 18 and the polarizing circuit. When the pendulum passes switch 36 at time $c$ (Fig. 4) the measuring circuit is completed and a potential difference between the electrodes due to the recent earth polarization will be indicated on instrument 23. When the pendulum 32 passes switch 35 at time $d$, the measuring circuit is again opened. The instrument 23, which is preferably a ballistic galvanometer will indicate a pulse of current which may be interpreted in terms of potential difference, the time interval $d\ c$ being known. Or the switch 28 may be thrown to proper polarity and the potentiometer 30 may be varied until when the pendulum passes, no deflection of instrument 23 occurs. Under such circumstances, the potential difference is given by the position of the variable arm of potentiometer 30 and the voltage read on voltmeter 31. It will be seen, then that by this procedure I am able to measure the potential difference existing in the time interval $c\ d$, which is preferably made as short as practicable, and that the relative positioning of the interval $c\ d$ may be readily changed by moving the switches 35 and 36 along the arcuate rod 41. The process of polarization and measurement may be repeated, in which case I prefer to allow sufficient time interval $d\ f$ to elapse before repetition to permit the E. M. F. of polarization to fall substantially to zero in order that earth currents may again be balanced out without effect from any residual polarization and in order that the second polarization over time $a\ b$ may be a duplicate of the first. It may be remarked that the most accurate balancing of the electrode potential difference due to polarization by means of potentiometer 30 may most easily be accomplished by a continued repetition of the process, the approximation to perfect balance being improved with each repetition by readjustment of the potentiometer.

The above-described measurements are all repeated, keeping constant the time intervals $a\ b$, and $c\ d$, but at a series of progressively increasing intervals $b\ c=t$ as represented in Figs. 4—I, II, and III. In this manner the potential difference between the electrodes, measured during the interval $c\ d$, is determined at a sufficient number of different times during the discharge of polarization from time $b$ to time $f$ to locate the entire discharge portion of the curve. The measured values of potential difference which are proportional to the ordinates $V_1$, $V_2$, and $V_3$, may then be plotted as in Fig. 6 against the corresponding time intervals $t_1$, $t_2$, and $t_3$ to produce the curve marked B, representing the discharge of polarization.

The entire foregoing series of tests is then repeated using a different polarizing time interval $a\ b$, as shown in Fig. 5—I, II, and III. Whereas, in the previous series the E. M. F. of polarization $e$ may have varied as in Fig. 7, rising until time B was reached and then falling along the dotted curve from that point, in the second series the polarizing period $a\ b$ may be made longer by increasing the time interval during which the pendulum remains in its uppermost position, whereby the E. M. F. of polarization will start to fall as indicated in Fig. 7 only when the time C is reached. With this polarizing time interval remaining constant, the potential difference between the electrodes is measured at different points along the discharge curve as has previously been described. The measured values of potential difference, proportional to ordinates $W_1$, $W_2$, and $W_3$ are then plotted against the corresponding time intervals $t_1$, $t_2$, $t_3$, as before, in Fig. 6 to produce the curve marked C, representing the discharge of polarization from the value it has at time C. Similar series of tests are made with longer and longer polarizing periods ending at times D, F, and G, at the latter of which times the E. M. F. of polarization has substantially reached its maximum, $e_{max}$. Curves D. F, and G may then be plotted, as in Fig. 6, in the same manner as has been described for curves B and C.

The ordinates $e_B$, $e_C$, $e_D$, $e_F$, and $e_G$ of the intersections of curves B, C, D, F, and G, respectively, in Fig. 6 with the $t=0$ axis correspond to the potential differences between the electrodes due to the polarization of the earth at the times B, C, D, F, and G, respectively, in Fig. 7 which are the terminations of the respective polarizing periods. Hence, since these potential differences are proportional to the E. M. F.'s of polarization existing at the corresponding times, if these ordinates are plotted against the corresponding times as in Fig. 7 the resulting curve will represent the E. M. F. of polarization of the earth during the polarizing period and will correspond to that shown in Fig. 2 for the period from $T_0$ to $T_1$. The discharge portion of the curve of Fig. 2 from $T_1$ to $T_2$ corresponds to the dotted curve starting at time G in Fig. 7 and is determined from measurements of potential difference for different values of the interval $t$ as described above for curves B and C.

While the shape of the $e$ vs. time curve may be found in the manner just described, in order to fix the absolute value of $e$ at any time it is necessary to resort to the equation $$I=\frac{E-e}{R}$$

where I is the current in the polarizing circuit, E is the applied E. M. F., $e$ is the E. M. F. of polarization, and R is the ohmic resistance of the earth between the electrodes. When $e$ is a maximum, I is a minimum=$I_{min}$. E is known. $I_{min}$ may be obtained by simply keeping switch 18 closed for a very long time and noting the value to which the current through meter 43 finally falls. R may be determined by impressing upon the electrodes in the earth an electromotive force large compared to the E. M. F. of polarization normally set up and measuring the rate of change of the current with the impressed E. M. F. This rate of change is the conductance of which the resistance is the reciprocal. By applying these values in the equation above-mentioned, $e_{max}$. may be found, and since the relation of $e_{max}$. to $e$ at any time is known from Fig. 7, $e$ at any time may be found.

While the cycle of polarizing and measuring periods illustrated in Figs. 4 and 5 may be repeated continually by means of the apparatus above-described, I prefer to employ the apparatus of Fig. 8 for multi-cycle use. The operation of this somewhat complicated circuit may be better understood by referring first to a simplified circuit, shown in Fig. 9 which illustrates the functions of the circuit of Fig. 8. In Fig. 9, I show two spaced electrodes 100 and 101 electrically connected to the earth 44 and in a circuit with the source 17 of direct current and a switch 102, and direct current measuring instrument 43, to form a polarizing circuit. I provide in this case two additional spaced electrodes 103 and 104, which are preferably of a non-polarizing type and are electrically connected to the earth preferably in the region intermediate the electrodes 100 and 101. The electrodes 103 and 104 are connected in a measuring circuit comprising the switch 105, direct current measuring instrument 23 and the balancing circuits 21 and 22, similar to the circuit of Fig. 3. The balancing circuit 21 comprises potentiometer 29, reversing switch 27, and battery 25; and the balancing circuit 22 comprises potentiometer 30, voltmeter 31, reversing switch 28 and battery 26 all connected in the same manner as described above in connection with the circuit of Fig. 3.

It will be observed that the electrical circuit of Fig. 9 differs from the circuit of Fig. 3 principally in that in Fig. 9 the polarizing and measuring circuits are connected to separate pairs of electrodes, and it will be obvious that in the apparatus of Fig. 3 the polarizing and measuring circuits may likewise be connected to separate pairs of electrodes, in which case only the electrodes in the measuring circuit need be of the non-polarizing type. The operation of the circuit is also similar to that of the circuit of Fig. 3. The switch 102 is first left open and the switch 105 is closed to complete the measuring circuit. The normal earth currents are then balanced out by adjustment of the potentiometer 29, with the potentiometer 30 in a position to introduce no potential difference into the circuit, as described above in connection with Fig. 3. The switch 105 is then opened and switch 102 closed at time $a_1$ in Fig. 10 to polarize the earth for a predetermined period of time $a_1 b_1$, after which the switch 102 is opened. Following the termination of the polarizing period by a predetermined time interval $b_1 c_1$, the switch 105 is closed to complete the measuring circuit and is left closed for an interval $c_1 d_1$. After another interval $d_1 a_2$ following the measuring period $c_1 d_1$, the switch 102 is again closed at time $a_2$ and the entire cycle is repeated. The function of the circuit of Fig. 8 is to automatically perform the functions of switches 102 and 105 above-described and to continually repeat a predetermined cycle, the intervals of which are variable at will. During the measuring period, the potential difference between the electrodes exhibits itself as an indication on the instrument 23 and this may be measured by balancing out this potential difference by adjustment of the potentiometer 30 so that no current is indicated through instrument 23. The position of the potentiometer 30 and the reading of voltmeter 31 then serve to measure the potential difference existing between the electrodes during the measuring period $c\ d$.

In the apparatus of Fig. 8 are employed four thyratron tubes 50, 51, 52, and 53 connected in circuit with four three-pole double-throw relays 54, 55, 56, and 57, respectively, to cause operation of these relays to connect the polarizing and measuring circuits at the proper times. Each of the thyratrons is operatively connected to its associated relay in the same manner. A source 58 of direct current is connected in parallel with each of the potentiometers 59, 60, 61, and 62, the positive terminal of each potentiometer being connected to the cathode of its associated thyratron, and the movable arm of each potentiometer being connected to the grid of its associated thyratron. The cathodes of all the thyratrons are connected together and to the negative terminal of the source 63 of direct current. The anodes of the thyratrons 50, 51, 52, and 53 are connected through the operating coils 64, 65, 66, and 67 of the respective associated relays and through variable resistances 68, 69, 70, and 71, respectively, to one terminal of one switch of each relay, respectively, here shown as the upper terminal of the left-hand switch of each relay. The switch arm of the left-hand switch of the first relay 54 is connected to the positive terminal of source 63. The lower terminal of the left-hand switch in each relay is connected to the switch arm of the left-hand switch of the succeeding relay. Thus, in Fig. 8, the left-hand switch of each relay controls the anode circuit as above-described, the normal position of the switch arms of each relay being up, as shown. A condenser 72 is connected between the cathode of thyratron 50 and a point between resistance 68 and relay coil 64. Similar condensers 73, 74, and 75, but not necessarily of the same capacity, are connected similarly in the circuits of thyratrons 51, 52, and 53, respectively.

The operation of each of the thyratron circuits may be understood from a consideration of the operation of the first. With the relay 54 in normal position, shown in Fig. 8, the condenser 72 will be charged through resistance 68, taking a time dependent upon the product of the resistance 68 and the capacity of the condenser 72. When a certain potential difference across the condenser 72 is reached, the thyratron 50 will break down and current will pass through the tube from anode to cathode and, therefore, through operating coil 64 of the relay 54, causing the relay to operate and contact the switch arms to the lower contacts until the relay is reset in normal position. When the relay operates, the right-hand switch arm is contacted to its lower contact completing the polarizing circuit including source 17, instrument 43, and electrodes 100 and 101, which circuit also includes the right-hand switch of relay 55 when in its normal position. Thus, when relay 54 operates, the polarizing circuit is closed and also the electromotive force of source 63 is applied to the succeeding thyratron circuit involving tube 51. The latter circuit proceeds immediately to function as did the first and after a time interval, determined by the resistance 69 and capacity of condenser 73, thyratron 51 breaks down and relay 55 is operated. This breaks the polarizing circuit including electrodes 100 and 101, and sends the electromotive force of source 63 to the circuit of thyratron 52. After a time interval determined by resistance 70 and capacity of condenser 74, the relay 56 operates, applying electromotive force to the circuit of thyratron 53 and completing the measuring circuit including electrodes 103 and 104, the instrument 23 and the balancing circuits 21 and 22, which circuit also includes the right-hand switch of relay 57 in its normal position. After another time interval determined by resistance 71 and the capacity of condenser 75, the relay 57 operates, opening the measuring circuit. In this manner the polarizing circuit is caused to be closed for an interval of time which can be changed by varying resistance 69, then opened, and after an interval of time which may be changed by varying resistance 70, the measuring circuit is closed and remains closed for an interval of time which may be varied by changing resistance 71. With the relay circuit including only that which is described above, a single cycle similar to that shown from a to f of Figs. 4 and 5 may be produced and the time intervals of the several periods may be made anything desired by variation of the proper resistances and capacities.

To repeat the cycle, the relays may be reset manually, but there are preferably provided automatic resetting means now to be described. All of the switch arms of the middle switches of relays 54, 55, 56, and 57 are connected together and to a reset coil 80 on relay 57. The other side of this coil is connected through resistance 81 to one terminal of the electric source 82. The lower contact of the middle switch of relay 57 is connected through the switch 83 to the other terminal of source 82. The lower contacts of the middle switches of the other relays 54, 55, and 56 are connected through reset coils 84, 85, and 86, respectively, to the first-mentioned terminal of source 82. A resistance 87 is included in series with the reset coil 85. The reset coils of the relays are adapted, when energized, to return the respective relays to normal position.

With the switch 83 closed, and relays 54, 55, and 56, operated and in contact with the lower contacts, the operation of relay 57 will reset the entire group of relays because when relay 57 operates, all of the switch arms of the middle switches of the relays become energized and, since all of these switches are now closed to the lower contacts, current will flow through all the reset coils, bringing the relays all into normal position again and initiating another cycle. In order to insure relays 54 and 56 being reset prior to relays 55 and 57, and to insure relay 57 being reset last, resistances 87 and 81 of suitable values are provided in the reset circuits of relays 55 and 57 to delay the resetting of these relays. In this manner the cycle will automatically repeat indefinitely. By opening the switch 83, I may stop the operation of the circuit at the end of any chosen cycle.

It will be evident that by use of the above-described apparatus one may measure the potential difference between the earth connected electrodes during discharge of polarization and over an indefinite number of cycles, the first few of which may be illustrated as in Fig. 10. I may follow the same general procedure as outlined above in connection with the use of the apparatus of Fig. 3, the potential difference being measured over a relatively short interval of time following by various time intervals the termination of the polarizing period, as in Fig. 4, to secure a series of potential differences which may be plotted against the corresponding times to produce a curve representing polarization E. M. F. vs. time during the discharge of polarization. This series of tests may be repeated using a different time of polarization as in Fig. 5, and the results be employed in determining the complete e vs. time curve as previously described. In these measurements taken at different points along the discharge curve, I may allow the cycle length P to be long enough to permit the E. M. F. of polarization to fall substantially to zero, or I may operate with a cycle length less than that required to permit the E. M. F. of polarization to fall to zero, as illustrated in Fig. 10. Here the E. M. F. starts at $a_2$ with a considerable E. M. F. remaining so that at the end $b_2$ of the second polarizing period, the E. M. F. is higher than at the end $b_1$ of the first polarizing period. This increase from cycle to cycle continues until an equilibrium condition is arrived at when the discharge curve will correspond to that obtained by the apparatus of Fig. 3 with a longer polarizing period. When the polarizing period a b is about 0.1 second and the total time P of one cycle is about 0.3 second, equilibrium is reached in about 35 seconds.

In the series of measurements described above in which the electrode potential difference is measured at various points along the discharge curve, I am careful to maintain, in each case, the total time period P of one cycle the same, so that even though some E. M. F. of polarization remains at the end of each cycle as in Fig. 10, the correct shape of discharge curve is obtained, even though corresponding to a polarizing period somewhat longer than that actually employed in each cycle, but no distortion of the discharge curve results.

Primarily because of the possibility that the potential difference due to earth currents may gradually vary from that which exists when this potential difference is balanced out at the beginning of a test, and may thereby, produce an error in the measurement of potential difference due to polarization, I preferably employ the more complicated apparatus of Fig. 11 which permits this effect to be compensated and which has other advantages. A simplified circuit diagram, illustrating the functions performed by the apparatus of Fig. 11, is shown in Fig. 12. This circuit is the same as that of Fig. 9 except that the additional switch 106 and the direct current measuring instrument 107 are connected in series between the electrode 104 and a point midway between the balancing circuits 21 and 22, the earth current balancing circuit being between the point of connection and the electrode 103 so that when the switch 106 is closed a circuit is completed including electrodes 103 and 104, the balancing circuit 21 and the instrument 107.

The switches 102, 105, and 106 are preferably operated in such a manner as to result in the sequence of events generally illustrated in Fig. 13. The switch 102 is closed at $a_1$ to start the polarizing period $a_1 b_1$ and is opened at $b_1$ to terminate it. The switches 105 and 106 are open during the polarizing period. At $c_1$ the switch 105 closes, completing the measuring circuit and opens at $d_1$ to terminate the measuring period $c_1 d_1$. The potential difference due to earth polarization is exhibited during this period and is measured by balancing out current in the measuring circuit through adjustment of potentiometer 30 as above-described. At $f_1$ the switch 106 closes and at a later time $g_1$ opens again. During the time interval $f_1 g_1$ the balancing circuit 21 is connected through instrument 107 to the electrodes 103 and 104 and whatever potential difference exists between the electrodes at that time may be balanced out by adjusting the potentiometer 29. At time $a_2$ the switch 102 again closes and initiates another cycle.

I may make the duration P of each cycle sufficiently long to permit the E. M. F. of polarization to decrease to a value very small compared to that existing at the end of the polarizing period before the beginning of the next cycle, in which case the potential difference existing during the period f g is due substantially entirely to earth currents; or I may make the duration P of each cycle of such length that at the beginning a of each cycle a substantial E. M. F. of polarization remains, as in Fig. 13. In this case, if the interval f g is made relatively short and is located as near as practicable to the beginning of the succeeding cycle, and if the potential difference existing at the electrodes during the interval $fg$ is balanced out completely, the potential difference measured during interval $cd$ and attributed to earth polarization will be reduced by the amount of the potential difference due to polarization which was balanced out during interval $fg$. In a continuous series of cycles of the type represented in Fig. 13, the potential difference existing between the electrodes during the measuring period $cd$ gradually increases from that existing in the first cycle to some value under equilibrium conditions which is higher than that in the first cycle by about the amount remaining at the end of each cycle at equilibrium. Hence, this procedure of balancing out the potential difference remaining at the end of each cycle, by adjustment of the potentiometer 29, results in securing a measured potential difference during interval $cd$ under equilibrium conditions which is really representative of the curve of $e$ vs. time, without error due to polarization remaining at the end of each cycle.

In this manner, I may secure values of potential difference measured at various points along the discharge curve of $e$ vs. time, and repeat this series at various periods of polarization in a manner similar to that described in connection with Figs. 4 and 5 above. Throughout all these tests I preferably keep the total duration P of one cycle the same. I may then plot the data as described above and obtain the curve of $e$ vs. time.

The circuit of Fig. 11 which is preferably employed to secure these results will be seen to be somewhat similar to that of Fig. 8. In fact, it includes the apparatus of Fig. 8, and for this reason similar reference numerals are employed to designate corresponding parts of the two circuits, and only the differences between the two circuits will now be described. The circuit of Fig. 11 includes two additional thyratron tubes 110 and 111, having potentiometers 112 and 113, respectively, connected across the battery 58 and between the cathode and grid of each tube, respectively. The thyratrons 110 and 111 control relays 114 and 115, respectively, and have their anodes connected to the upper left-hand switches of the respective relays through relay operating coils 116 and 117, respectively, and variable resistances 118 and 119, respectively. Connected between the negative terminal of source 63 and a point between the variable resistance and the relay operating coil in the case of each thyratron circuit is a condenser of suitable value, designated by numeral 120 in the case of the circuit of tube 110, and by 121 in the case of the circuit of tube 111. The relay reset coils for the relays 114 and 115 are respectively designated by the numerals 122 and 123. In series with the reset coil 123 is the resistance 124 of suitable value to delay the resetting of relay 115 to cause it to be the last to reset.

It will be observed that the circuit of thyratron 110 is placed ahead of the circuit of thyratron 50 which begins the sequence of relay operations in Fig. 9, and the circuit of thyratron 111 is placed following the circuit of thyratron 53 whose operation resets all the relays in Fig. 9. In the case of Fig. 11, the positive terminal of the source 63 is connected to the switch arm of the left-hand switch of relay 114, and at the beginning of relay operation, after resetting of all the relays, is connected by the left-hand switch of relay 114 to the resistance 118 in the anode circuit of thyratron 110. Under these circumstances, with the switches of relay 114 in their upper position the right-hand switch of relay 114 completes the circuit from electrode 104, through instrument 107 and balancing circuit 21 to electrode 103. The thyratron 110 will, after a period dependent upon resistance 118 and capacity of condenser 120, break down and current will flow through coil 116 to operate the relay 114. The E. M. F. of source 63 is then switched by left-hand switch of relay 114 to the circuit of thyratron 50, and at the same time the right-hand switch of relay 114 opens and the circuit between electrodes 103 and 104 is broken. The other thyratrons, 50, 51, 52, 53, and 111 then in succession break down and cause operation of their respective relays as described in connection with the circuit of Fig. 8. The operation of the last relay 115, through closing of its right-hand switch, causes current to flow through all of the reset coils, whereupon all of the relays are brought again to their upper switch positions and the above-described sequence is repeated.

The time $a$ of each cycle, in Fig. 13, corresponds with the operation of relay 54, $b$ with the operation of relay 55, $c$ with operation of relay 56, $d$ with operation of relay 57, $f$ with resetting of relay 114, and $g$ with operation of relay 114. Thus, the duration of interval $ab$ may be varied by adjusting resistance 69, the interval $bc$ by adjusting resistance 70, the interval $cd$ by adjusting resistance 71, the interval $df$ by adjusting resistance 119, the interval $fg$ by adjusting resistance 118, and the interval $ga$ by adjusting the resistance 68. The operation of the apparatus may be stopped following any selected measuring period by opening switch 83.

In practice, in the field, I preferably make measurements as described to obtain the shape of the curve of polarization E. M. F. vs. time at each of a number of different electrode spacings. The depth of an earth formation which can contribute substantially to the polarization effect is dependent upon the electrode spacing, the greater the spacing, the greater the depth of formation that can contribute. By gradually increasing the electrode spacing and noting at what spacing the curves begin to exhibit shapes and values characteristic of certain formations and structures, the depths of these formations and structures may be estimated, and in this manner, a zone 45 of oil-bearing sand, for example, may be located. When employing the apparatus with two pairs of electrodes, one pair may be kept stationary and the neighboring region be explored by means of the other pair.

While I have described the series of measurements as being made at only a single polarizing E. M. F. applied to the electrodes, it is understood that I may make other series at different E. M. F.'s, and compare the results for significant differences. This technique is particularly valuable in connection with a varying electrode spacing.

It is understood that various unmentioned changes in the method and apparatus disclosed may be made by those skilled in the art without departing from the spirit of the invention as defined in the appended claims.

I claim as my invention:
1. A method of geophysical prospecting comprising subjecting the earth to polarizing applications of a unidirectional electromotive force during polarizing periods of different duration, and measuring the resultant earth polarization at a plurality of times during the discharge of said polarization following polarizing applications of each duration, whereby is determined a relation between polarization and time during the build-up and discharge of polarization.

2. A method of geophysical prospecting comprising successively polarizing the earth by application thereto of a unidirectional electromotive force during polarizing periods of constant duration, successively measuring the resultant earth polarization at a plurality of times during discharge of said polarization, again successively polarizing the earth by application thereto of said electromotive force during polarizing periods of constant duration different from that of said first-mentioned polarizing periods, and again successively measuring the resultant earth polarization at a plurality of times during discharge of said polarization following said second-mentioned polarizing periods, whereby is determined a relation between polarization and time during the build-up and discharge of polarization.

3. A method of geophysical prospecting comprising successively polarizing the earth by application thereto through spaced electrodes of a unidirectional electromotive force during polarizing periods of constant duration, successively measuring between spaced points in the earth the potential difference due to the resultant earth polarization at a plurality of times during discharge of said polarization, again successively polarizing the earth by application thereto of said electromotive force during polarizing periods of constant duration different from that of said first-mentioned polarizing periods, and again successively measuring between said points the potential difference due to the resultant earth polarization at a plurality of times during discharge of said polarization following said second-mentioned polarizing periods, whereby is determined a relation between said potential difference and time during the build-up and discharge of polarization.

4. A method of geophysical prospecting comprising polarizing the earth by application thereto through spaced electrodes of an intermittent unidirectional electromotive force during polarizing periods of constant duration, successively measuring between spaced points in the earth the potential difference due to earth polarization at a plurality of times during the discharge intervals between individual applications of said electromotive force, again polarizing the earth by application thereto through said electrodes of said intermittent unidirectional electromotive force during polarizing periods of constant duration different from that of said first-mentioned polarizing periods, and successively measuring between said spaced points in the earth the potential difference due to earth polarization at a plurality of times during the discharge intervals between said second-mentioned polarizing periods, whereby is determined a relation between said potential difference and time during the build-up and discharge of polarization.

5. A method of geophysical prospecting comprising subjecting the earth through spaced electrodes to intermittent polarizing applications of a unidirectional electromotive force of constant duration, intermittently measuring between spaced points in the earth the potential difference due to earth polarization during measuring periods of constant duration within the intervals between said polarizing applications, and repeating said intermittent polarization and intermittent measurement employing in each repetition intermittent polarizing applications of the same duration and following one another by the same interval, but said measuring periods in the several repetitions transpiring at different times within said intervals between polarizing applications.

6. A method of geophysical prospecting comprising subjecting the earth through spaced electrodes to intermittent polarizing applications of a unidirectional electromotive force, and while maintaining the duration of said polarizing applications the same and the discharge intervals between said polarizing applications the same, successively measuring between spaced points in the earth the potential difference due to earth polarization at a plurality of times during said discharge intervals.

7. A method of geophysical prospecting comprising repeatedly subjecting the earth through spaced electrodes to intermittent polarizing applications of a unidirectional electromotive force, the duration of said polarizing applications being successively different in the several repetitions but the discharge intervals between the polarizing applications being the same in the several repetitions, and in each repetition while maintaining the duration of said polarizing applications the same and the discharge intervals between said polarizing applications the same, successively measuring between spaced points in the earth the potential difference due to earth polarization at a plurality of times during said discharge intervals, whereby is determined a relation between said potential difference and time during the build-up and discharge of earth polarization.

GENNADY POTAPENKO.